March 31, 1936.    D. PYZEL    2,035,506
GAS COOLER
Filed Nov. 19, 1932
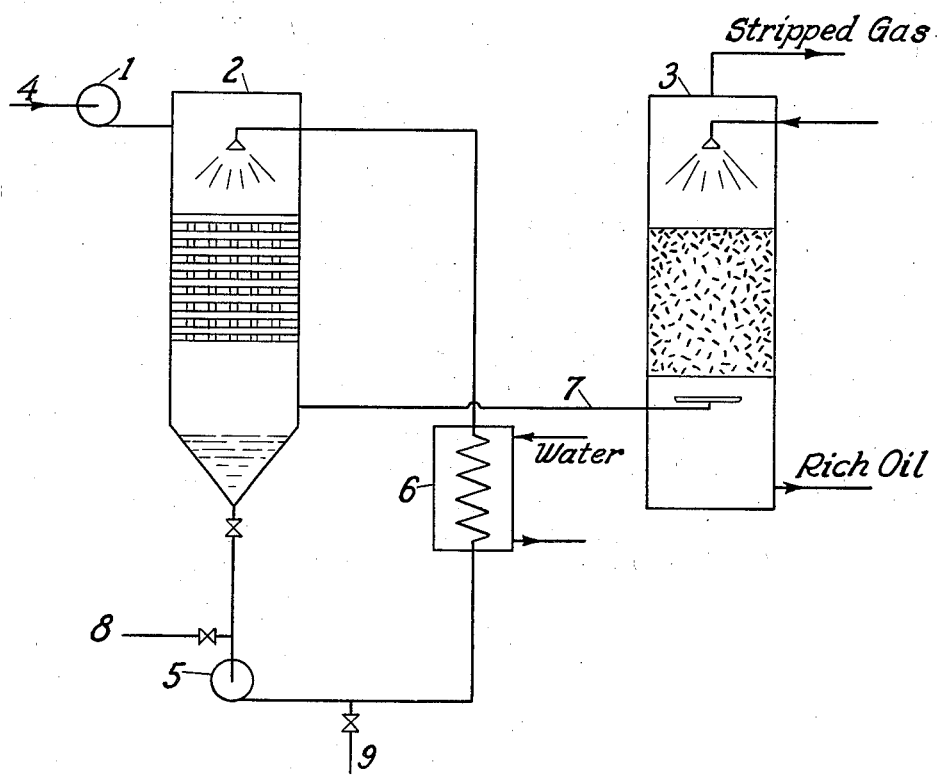
Inventor. D. Pyzel
By his Attorney Patented Mar. 31, 1936

2,035,506

UNITED STATES PATENT OFFICE 2,035,506

GAS COOLER

Daniel Pyzel, Piedmont, Calif., assignor to Shell Development Company, San Francisco, Calif., a corporation of Delaware Application November 19, 1932, Serial No. 643,497

2 Claims. (Cl. 196—7)

This invention relates to cooling of gaseous fluids and is particularly concerned with an improvement in the methods of withdrawing the heat from the uncondensable heat carrier gases used in certain vapor phase cracking processes. It is customary in these processes to recycle the heat carrier gas through a system, wherein the gas is heated and mixed with the oil being treated; the mixture is passed through a series of rectifying zones in which the gas is substantially freed of the admixed products of cracking, and then again heated and reused, after the last appreciable quantities of the hydrocarbon vapors had been separated. The substantially complete removal of the vapors is necessary in order to avoid their subsequent decomposition at high temperatures to which gas is subjected, and which decomposition would usually be accompanied by deposition of the objectionable gummy materials within the system; this removal is ordinarily accomplished by compressing the precooled gaseous mixture, cooling the compressed mixture, and then scrubbing it with a suitable solvent in order to remove the residual hydrocarbons carried by the gas.

It was proposed in the Patent No. 1,872,349, relating to a similar oil treating system, to cool the compressed gases by an indirect heat exchange means and/or by spraying water into the gas, the latter step being intended for the removal of sulfur compounds from the gas.

I have found it much more advantageous, however, to cool the compressed gas vapor mixture by spraying thereinto a continuous stream of cold substantially non-volatile liquid, which is continuously collected after its contact with the gaseous mixture, cooled by passing through a heat exchange means, and then again sprayed into the gas stream.

The operation of the preferred embodiment of my invention can be better understood from the attached diagrammatic drawing, wherein I represents a gas blower or compressor forcing a gas-hydrocarbon vapor mixture to flow through the oil scrubber 2 and absorber 3. The mixture of the uncondensable gas and residual hydrocarbon vapors flows through a conduit 4 to the blower 1. The temperature of the gaseous mixture is raised as the result of compression; the excess heat is then withdrawn from the gas in the scrubber 2 by a spray of cold oil delivered to the top of the scrubber 2 by a pump 5 from a cooler 6, which may be of any conventional design. After an intimate contact with the hot gases during concurrent flow through the packed scrubber 2 the oil accumulates at the bottom of the scrubber and is picked up by suction of the pump 5, passed through the cooler 6, and thus continuously circulated. The cooled gaseous mixture passes through a conduit 7 to the absorber 3, wherein it is stripped of the remaining hydrocarbons, and then returned to the cracking process. The pipe connections 8 and 9 serve respectively for introducing fresh oil into the cooling system and draining the used oil out of the system.

It should be noted that the gaseous mixture reaching the blower is normally composed of such volatile materials which do not condense at the temperature and under the pressure prevailing in the cooler. I found that, when properly selected, the cooling liquid remains in service for prolonged periods of time without requiring replacing or the addition of fresh supply. After a short time of operation the fresh liquid becomes saturated with the gas and then functions solely as a heat absorbing medium.

While it is preferable in the actual practice to use, as a gas cooling medium, a liquid having relatively low vapor pressures at the temperatures of the gas cooler, such as the known absorption, or straw, or gas oils, and generally the oils having I. B. P above 300° F., I may also successfully use the liquids of somewhat higher volatility, even such as water, the selection of the cooling medium being entirely governed by the extreme thermal conditions in the cooler 6. Normally, the temperature of the compressed gases entering the cooler is from 120° F. to 150° F., this temperature is reduced in the cooler to 80° F. or below, in order to obtain proper removal of the hydrocarbon vapors in the absorber. My method of continually circulating a cooling medium, which after its saturation with gases being cooled performs no other function but cooling these hot gases, offers an efficient and convenient solution of this problem.

I claim as my invention:

1. In a process of cracking oils to produce a motor fuel of the gasoline type, wherein the cracking is brought about by the aid of an inert heat-carrier gas which is commingled with the hydrocarbon vapors to be cracked, the steps of cooling the gas and vapor mixture at a point following the cracking step to condense out the gasoline formed but leaving the gas partially saturated with such vapors and then prior to recirculating the gas to constitute the heat carrier again, compressing said gas to propel it through the system and to increase the concentration of residual vapors in the gas, then removing heat from said gas including at least a portion of that acquired by the compression step, by spraying therein a stream of a relatively cold, substantially non-volatile oil saturated with said gas and residual vapor under conditions which result in substantially no condensation of said residual vapors, and then passing the cooled gas to an absorber wherein substantially all of the residual vapors are removed.

2. In a process of cracking oils to produce a motor fuel of the gasoline type, wherein the cracking is brought about by the aid of an inert heat-carrier gas which is commingled with the hydrocarbon vapors to be cracked, the steps of cooling the gas and vapor mixture at a point following the cracking step to condense out the gasoline formed but leaving the gas partially saturated with such vapors and then prior to recirculating the gas to constitute the heat carrier again, compressing said gas to propel it through the system and to increase the concentration of residual vapors in the gas, then removing heat from said gas including at least a portion of that acquired by the compression step, by spraying therein a stream of a relatively cold, substantially non-volatile oil saturated with said gas and residual vapor under conditions which result in cooling the gas from an initial temperature of 120° F. to 150° F. approximately to approximately 80° without any substantial condensation of said residual vapors, and then passing the cooled gas to an absorber wherein substantially all of the residual vapors are removed.

DANIEL PYZEL.